April 17, 1951  H. R. CHRISTENOT  2,548,868
SELF-ADJUSTING HYDRAULIC BRAKE CYLINDER
Filed Aug. 2, 1948
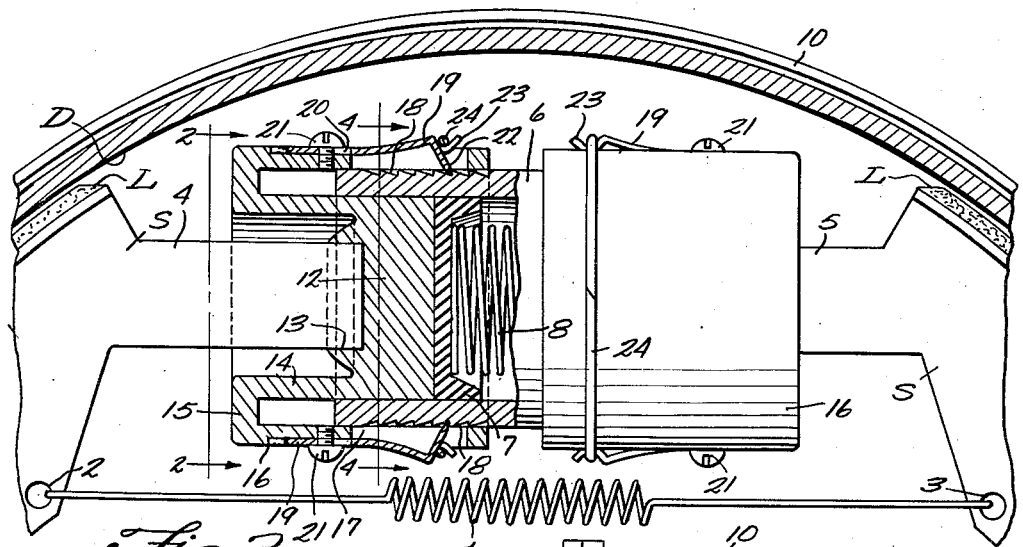
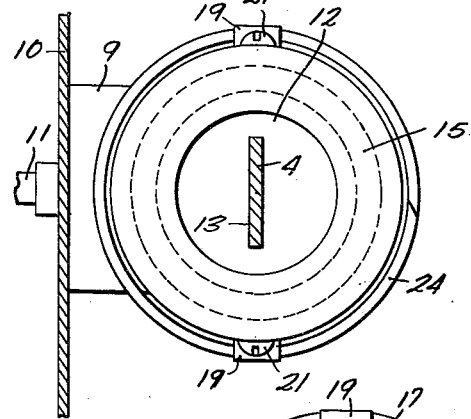
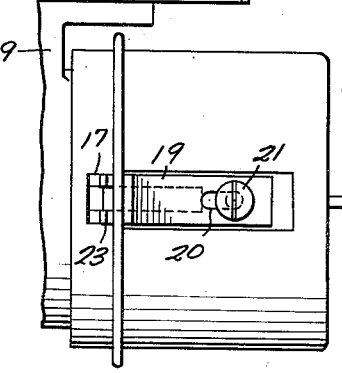
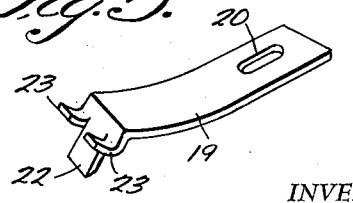
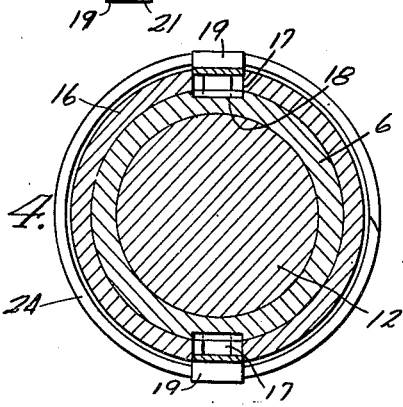
INVENTOR.
Harley R. Christenot
BY Victor J. Evans & Co.
ATTORNEYS Patented Apr. 17, 1951

2,548,868

UNITED STATES PATENT OFFICE 2,548,868

SELF-ADJUSTING HYDRAULIC BRAKE CYLINDER

Harley R. Christenot, Cut Bank, Mont.

Application August 2, 1948, Serial No. 41,948

2 Claims. (Cl. 188—79.5)

The present invention relates to the general class of hydraulic wheel brakes for automotive vehicles, and more specifically to an improved self-adjusting hydraulic brake cylinder having transversely movable and expanding brake shoes for gripping the rim of a brake drum, and equipped with mechanical means actuated by fluid pressure for automatically taking up wear on the lining of the brake shoes.

The wheel brake unit of my invention includes a minimum number of parts that may with facility be manufactured at low cost of production, and the parts may be assembled with convenience to provide a reliable appliance for the performance of its functions, and which is automatically maintained in efficient working condition until replacement of parts are required. The replacement of parts, such as re-lining of the brake shoes may be accomplished with ease and a minimum expense, and initially the brakes may readily be adjusted between the cylinder and the brake drum.

The invention resides in certain novel features of construction and combinations and arrangements of parts as will hereinafter be described and more particularly set forth in the appended claims.

In the accompanying drawings I have illustrated a complete example of a physical embodiment of my invention in which the parts are combined and arranged in accord with one mode I have devised for the practical application of the principles of my invention. It will however be understood that changes and alterations are contemplated and may be made in these exemplifying drawings and mechanical structures, within the scope of my claims, without departing from the principles of the invention.

Figure 1 is a view in side elevation and partial vertical section of a brake cylinder in which my invention is embodied, and showing a portion of the complementary brake drum.

Figure 2 is a vertical transverse sectional view at line 2—2 of Figure 1.

Figure 3 is a top plan view of the right hand portion of the brake cylinder.

Figure 4 is a transverse vertical sectional view at line 4—4 of Fig. 1; and

Figure 5 is a perspective view of one of a pair of spring detents employed in the automatic adjustment of the brake shoes.

In order that the general arrangement and utility of parts may readily be understood I have shown in the assembly view Fig. 1 a portion of a conventional brake drum D that is gripped by the two opposed shoes S, S, having exterior replaceable lining L.

As usual, the shoes are retracted and resiliently held by a spring 1 attached at 2 and 3 to the shoes, and each shoe is equipped with an inwardly projecting arm, as 4 and 5 alined with the longitudinal axis of the open end cylinder 6 having centrally arranged spaced sealing cups 7, 7 separated by the main spring 8.

For supporting the cylinder it is provided with a bracket 9, and face plate 10, and an intake to the longitudinal center of the cylinder is indicated at 11 for fluid pressure in expanding the spring retracted brake shoes.

Two complementary pistons 12 are reciprocable in the opposite ends of the cylinder, and inasmuch as they are of similar construction, a description of one will suffice for both of them. In its outer face each piston is fashioned with a vertical groove or socket 13 which receives and retains the inner end of a shoe-arm, and thereby prevents relative movement or twisting of the piston and holds the parts in alinement.

The outer end of the piston is provided with an integral enlarged extension or open center head that performs the functions of a dust cap, and which is slidably mounted on the outer periphery of the cylinder for adjustment in taking up wear on the lining L. The open center head or extension cap includes an inner annular flange 14, a return bend 15 forming a face ring, and an exterior annular flange 16 that fits over the periphery of the cylinder and forms the dust cap, as well as a support for the cylinder.

As the lining L wears, due to successive applications of the brake under hydraulic or other fluid pressure, the piston travels an increasing distance to apply the brakes to the drum, and this distance is taken up or compensated for by automatic adjustment of the piston with relation to the cylinder. For this purpose the exterior flange 16 of the piston head is milled to form two diametrically spaced and longitudinally extending slots 17, 17, and the exterior surface of the cylinder at adjoining diametrical points is provided with a longitudinally extending series of transversely arranged rack teeth 18 registering with the slots.

A leaf spring, or spring detent 19, which is slotted at 20, is attached as by screw 21 to the outer end of the piston 12 and these adjustable detents are positioned to project into the complementary slots 17, as shown. The free end of each detent terminates in a central dog or pawl 22 that co-acts with the rack teeth 18, and a pair of lugs 23 are fashioned next to the pawl to form seats for a split retaining ring 24 that may be slipped over the outer end of the piston head to resiliently hold down the spring detents.

The maintenance of the proper brake shoe clearance is determined by the relative movement between the spring detent 19 and the screw 21 through the medium of the slot 20. The length of the slot determining the relative movement of the spring detent and the brake shoe clearance. Thus the slot is formed to provide the clearance prescribed by the manufacturer.

In the initial adjustment of the brake shoes, the slotted detents may first be adjusted and movably secured by their screws so that the pistons with their shoes may be adjusted to the drum to give the required clearance between the brake shoe and brake drum. Once adjusted there will be sufficient movement of the screw 21 within the slot 20 to permit the spring 1 to retract the shoes 2 and 3 in the usual manner, once this adjustment has been made it will be maintained. Wear of the brake linings will be compensated for by fluid pressure in the cylinder and automatic adjustment of the pistons and their brake shoes. After the application of the brakes the piston 12 will move to retract the brake shoes through engagement of one end of the slot 20 with the screw 21 thus if the initial adjustment is correct there will always be sufficient clearance of the brake shoes to relieve the shoe from contact with the brake drum.

Having thus fully described my invention what I claim as new and desire to secure by Letters Patent is:

1. In a self-adjusting hydraulic brake appliance, the combination with a cylinder having an exterior longitudinal series of rack teeth and a reciprocable piston in the cylinder, of a head on the piston forming an inner annular groove fitting over the cylinder and slidable thereon, and an exterior spring detent attached to the head and projecting through a slot therein for coaction with the rack teeth for the purpose described.

2. The combination with an open end cylinder having two exterior diametrically arranged series of rack teeth near its ends, a pair of opposed pistons in the cylinder, and a pair of brake shoes actuated by the pistons, of an enlarged open end exterior head on each piston having a slotted extension forming an annular groove and slidable on the cylinder, a spring detent attached to said extension and projecting therethrough for coaction with each series of rack teeth, and a split ring surrounding each of the extensions for retaining the spring detents in operative engagement with the rack teeth.

HARLEY R. CHRISTENOT.

REFERENCES CITED

The following references are of record in the file of this patent:

UNITED STATES PATENTS

| Number | Name | Date |
|---|---|---|
| 1,683,057 | Scese | Sept. 4, 1928 |
| 2,117,288 | Blucher | May 17, 1938 |
| 2,211,136 | Lane | Aug. 13, 1940 |
| 2,374,117 | Mollenhauler | Apr. 17, 1945 |